United States Patent [19]

Lingscheit et al.

[11] 3,985,576

[45] Oct. 12, 1976

[54] SEAL FOR ENERGY CONVERSION DEVICES

[75] Inventors: James N. Lingscheit, Dearborn; Thomas J. Whalen, Detroit, both of Mich.

[73] Assignee: Ford Motor Company, Dearborn, Mich.

[22] Filed: Feb. 18, 1976

[21] Appl. No.: 658,981

[52] U.S. Cl. .................. 429/103; 429/174; 403/179

[51] Int. Cl.² .................. H01M 43/00

[58] Field of Search .................. 136/6 F, 6 FS, 6 LF, 136/20, 83 R, 100 R, 153, 133

[56] References Cited

UNITED STATES PATENTS

| | | | |
|---|---|---|---|
| 3,413,150 | 11/1968 | Kummer et al. | 136/6 FS |
| 3,811,943 | 5/1974 | Minck et al. | 136/6 FS |
| 3,841,912 | 10/1974 | Kagawa et al. | 136/6 FS |

*Primary Examiner*—Anthony Skapars
*Attorney, Agent, or Firm*—Roger L. May; Keith L. Zerschling

[57] ABSTRACT

An improved energy conversion device of the type comprising: (A) an anodic reaction zone, (i) which contains a molten alkali metal anode-reactant in electrical contact with an external circuit, and (ii) which is disposed interiorly of a tubular cation-permeable barrier to mass liquid transfer; (B) a cathodic reaction zone (i) which is disposed exteriorly of said tubular cation-permeable barrier, and (ii) which contains an electrode which is in electrical contact with both said tubular cation-permeable barrier and said external circuit; (C) a reservoir for said molten alkali metal which is adapted to supply said anode-reactant to said anodic reaction zone; and (D) a tubular ceramic header (i) which connects said reservoir with said anodic reaction zone so as to allow molten alkali metal to flow from said reservoir to said anodic reaction zone, (ii) which is sealed to said tubular cation-permeable barrier, and (iii) which is impervious and nonconductive so as to preclude both ionic and electronic current leakage between the alkali metal reservoir and the cathodic reaction zone. The improvement of the invention comprises a lap joint seal between the tubular ceramic header and said tubular cation-permeable barrier which is formed by (1) disposing the end portion of a first one of said tubes, which has been sintered to final density, inside the end portion of the second of said tubes which (i) is not sintered to final density, (ii) has an inner diameter in the unsintered state greater than the outer diameter of said first tube, and (iii) upon being sintered to final density is adapted to shrink to the extent that the inner diameter thereof is at least 0.002 inches less than the outer diameter of said first tube; and (2) sintering said second tube to shrink the same and effect a seal between said first and second tubes.

19 Claims, 2 Drawing Figures

SEAL FOR ENERGY CONVERSION DEVICES

This application relates to an improved electrical conversion device.

More particularly, this application relates to an improved seal for bonding a nonconductive tubular ceramic header to the tubular cation-permeable barrier to mass liquid transfer in such device.

BACKGROUND OF THE INVENTION

A recently developed type of energy conversion device comprises: (A) an anodic reaction zone (i) which contains a molten alkali metal anode-reactant in electrical contact with an external circuit, and (ii) which is disposed interiorly of a tubular cation-permeable barrier to mass liquid transfer; (B) a cathodic reaction zone (i) which is disposed exteriorly of said tubular cation-permeable barrier, and (ii) which contains an electrode which is in electrical contact with both said tubular cation-permeable barrier and said external circuit; (C) a reservoir for said molten alkali metal which is adapted to supply said anode-reactant to said anodic reaction zone; and (D) a tubular ceramic header (i) which connects said reservoir with said anodic reaction zone so as to allow molten alkali metal to flow from said reservoir to said anodic reaction zone, (ii) which is sealed to said tubular cation-permeable barrier, and (iii) which is impervious and nonconductive so as to preclude both ionic and electronic current leakage between the alkali metal reservoir and the cathodic reaction zone. Among the energy conversion devices falling within this general class are: (1) primary batteries employing electrochemically reactive oxidants and reductants in contact with and on opposite sides of the tubular cation-permeable barrier; (2) secondary batteries employing molten electrochemically reversibly reative oxidants and reductants in contact with and on opposite sides of the tubular cation-permeable barrier; (3) thermoelectric generators wherein a temperature and pressure differential is maintained between anodic and cathodic reaction zones and/or between anode and cathode and the molten alkali metal is converted to ionic form passed through the cation-permeable barrier and reconverted to elemental form; and (4) thermally regenerated fuel cells.

A particularly preferred type of secondary battery or cell falling within the type of energy conversion device discussed above is the alkali metal/sulfur or polysulfide battery. During the discharge cycle of such a device, molten alkali metal atoms, e.g., sodium, surrender an electron to the external circuit and the resulting cation passes through the tubular barrier and into the liquid electrolyte in the cathode reaction zone to unite with polysulfide ions. The polysulfide ions are formed by charge transfer on the surface of the electrode by reaction of the cathodic reactant with electrons conducted through the electrode from the external circuit. Because the ionic conductivity of the liquid electrolyte is less than the electronic conductivity of the electrode material, it is desirable during discharge that both electrons and sulfur be applied to and distributed along the surface of the electrode in the vicinity of the cation-permeable barrier. When the sulfur and electrons are so supplied, polysulfide ions can be formed near the tubular barrier and the alkali metal cations can pass out of the tubular barrier into the liquid electrolyte and combine to form alkali metal polysulfide near the barrier. As the device begins to discharge, the mole fraction of elemental sulfur drops while the open circuit voltage remains constant. During this portion of the discharge cycle as the mole fraction of sulfur drops from 1.0 to approximately 0.72 the cathodic reactant displays two phases, one being essentially pure sulfur and the other being sulfur saturated alkali metal polysulfide in which the molar ratio of sulfur to alkali metal is about 5.2:2. When the device is discharged to the point where the mole fraction of sulfur is about 0.72 the cathodic reactant becomes one phase in nature since all elemental sulfur has formed polysulfide salts. As the device is discharged further, the cathodic reactant remains one phase in nature and as the mole fraction of sulfur drops so does the open circuit voltage corresponding to the change in the potential determining reaction. Thus, the device continues to discharge from a point where polysulfide salts contain sulfur and alkali metal in a molar ratio of approximately 5.2:2 to the point where polysulfide salts contain sulfur and alkali metal in a ratio of about 3:2. At this point the device is fully discharged.

During the charge cycle of such a device when a negative potential larger than the open circuit cell voltage is applied to the anode the opposite process occurs. Thus, electrons are removed from the alkali metal polysulfide by charge transfer at the surface of the electrode and are conducted through the electrode to the external circuit, and the alkali metal cation is conducted through the liquid electrolyte and tubular barrier to the anode where it accepts an electron from the external circuit. Because of the aforementioned relative conductivities of the ionic and electronic phases, this charging process occurs preferentially in the vicinity of the tubular barrier and leaves behind molten elemental sulfur.

Many of the electrical conversion devices discussed above, including the alkali metal/sulfur secondary cells or batteries, and a number of materials suitable for forming the cation-permeable barriers thereof are disclosed in the following U.S. Pat. Nos. 3,404,035; 3,404,036; 3,413,150; 3,446,677; 3,458,356; 3,468,709; 3,468,719; 3,475,220; 3,475,223; 3,475,225; 3,535,163; 3,719,531 and 3,811,493.

Among the materials disclosed in the prior art, including the above patents, as being useful as the cation-permeable barrier are glasses and polycrystalline ceramic materials. Among the glasses which may be used with such devices and which demonstrate an unusually high resistance to attack by molten alkali metal are those having the following composition: (1) between about 47 and about 58 mole percent sodium oxide, about 0 to about 15, preferably about 3 to about 12, mole percent of aluminum oxide and about 34 to about 50 mole percent of silicon dioxide; and (2) about 35 to about 65, preferably about 47 to about 58, mole percent sodium oxide, about 0 to about 30, preferably about 20 to about 30, mole percent of aluminum oxide, and about 20 to about 50, preferably about 20 to about 30, mole percent boron oxide. These glasses may be prepared by conventional glass making procedures using the listed ingredients and firing at temperatures of about 2700° F.

The polycrystalline ceramic materials useful as cation-permeable barriers are bi- or multi-metal oxides. Among the polycrystalline bi- or multi-metal oxides most useful in the devices to which the improvement of this invention applies are those in the family of Beta-alumina all of which exhibit a generic crystalline structure which is readily identifiable by X-ray diffraction. Thus, Beta-type-alumina or sodium Beta-type alumina is a material which may be thought of as a series of layers of aluminum oxide held apart by columns of linear Al-O bond chains with sodium ions occupying sites between the aforementioned layers and columns. Among the numerous polycrystalline Beta-type-alumina materials useful as reaction zone separators or solid electrolytes are the following:

1. Standard Beta-type-alumina which exhibits the above-discussed crystalline structure comprising a series of layers of aluminum oxide held apart by layers of linear Al-O bond chains with sodium occupying sites between the aforementioned layers and columns. Beta-type-alumina is formed from compositions comprising at least about 80% by weight, preferably at least about 85% by weight, of aluminum oxide and between about 5 and about 15 weight percent, preferably between about 8 and about 11 weight percent, of sodium oxide. There are two well known crystalline forms of Beta-type-alumina, both of which demonstrate the generic Beta-type-alumina crystalline structure discussed hereinbefore and both of which can easily be identified by their own characteristic X-ray diffraction pattern. Beta-alumina is one crystalline form which may be represented by the formula $Na_2O.11Al_2O_3$. The second crystalline is B''-alumina which may be represented by the formular $Na_2O.6Al_2O_3$. It will be noted that the B'' crystalline form of Beta-type-alumina contains approximately twice as much soda (sodium oxide) per unit weight of material as does the Beta-alumina. It is the B''-alumina crystalline structure which is preferred for the formation of the cation-permeable barriers for the devices to which improvement of this invention is applicable. In fact, if the less desirable beta form is present in appreciable quantities in the final ceramic, certain electrical properties of the body will be impaired.

2. Boron oxide $B_2O_3$ modified Beta-type-alumina wherein about 0.1 to about 1 weight percent of boron oxide is added to the composition.

3. Substituted Beta-type-alumina wherein the sodium ions of the composition are replaced in part or in whole with other positive ions which are preferably metal ions.

4. Beta-type-alumina which is modified by the addition of a minor proportion by weight of metal ions having a valence not greater than 2 such that the modified Beta-type-alumina composition comprises a major proportion by weight of a metal ion in crystal lattice combination with cations which migrate in relation to the crystal lattice as a result of an electric field, the preferred embodiment for use in such electrical conversion devices being wherein the metal ion having a valence not greater than 2 is either lithium or magnesium or a combination of lithium and magnesium. These metals may be included in the composition in the form of lithium oxide of magnesium oxide or mixtures thereof in amounts ranging from 0.1 to about 5 weight percent.

As mentioned previously, the energy conversion devices to which the improvement of this invention applies include an alkali metal reservoir which contains the alkali metal anode-reactant and the level of which fluctuates during the operation of the device. This reservoir must be joined to the cation-permeable barrier in such a manner as to prevent both ionic and electronic current leakage between the alkali metal in the reservoir and the cathodic reaction zone. This insulation insures that the ionic conduction takes place in the cation-permeable barrier while the electronic conduction accompanying the chemical reaction follows the external shunt path resulting in useful work. Therefore, the sealing of an insulating alkali metal reservoir to the action-permeable barrier in such a manner as to prevent internal current leakage is critical to the satisfactory performance of the battery. This seal must also support the loads on the cation-permeable barrier or electrolyte assembly, should in no way introduce deleterious properties into the electrical conversion device system, and must withstand a variety of environments varying both in temperature and corrosive nature.

The seal which has been employed in the past for sealing the ceramic header or insulator to the cation-permeable seal has been a butt seal between the cylindrical cross-sections of the two tubular members. The glass normally employed for such a seal is a borosilicate glass formed from about 6 to about 11 weight percent of $Na_2O$, about 41 to about 51 weight percent of $SiO_2$ and about 53 to about 59 weight percent of $B_2O_3$. Such borosilicate glasses have a number of properties making them well suited for use as sealing components in electrical conversion devices. These properties include: (1) reasonably good chemical stability to liquid alkali metal, e.g., sodium, sulfur and various polysulfides at and above 300° C; (2) good wetting to, but limited reactivity with, alumina ceramics; (3) a thermal expansion coefficient closely matched to both alpha and beta alumina ceramics; (4) easy formability with good fluid properties and low strain, annealing and melting temperatures; and (5) low electrical conductivity and hence small diffusion coefficients.

The outstanding properties of the above borosilicate glasses notwithstanding, the butt seal configuration which has been employed results in a stress concentration in the glass component while the glass is simultaneously exposed to corrosive electrode materials. Of course, failure of the glass seal will result in catastrophic failure of the energy conversion device. Since the butt seal configuration allows a large surface area of relatively thin glass (e.i., the thickness of the tubular walls sealed) to be exposed to corrosive materials, the time for diffusion of materials, such as sodium, through the glass is less than desirable. In fact, this type of glass seal effectively limits the maximum temperature at which the sealed composite assembly may operate as the conductive component in such energy conversion devices since increased operating temperature which is desirable for enhanced cell performance is accompanied by accelerated corrosion and heightened stress which limit seal life.

BRIEF DESCRIPTION OF THE INVENTION

The improved seal of this invention overcomes many of the difficulties discussed above and, thus, removes the operational constraints now inhibiting high temperature operation of the energy conversion devices, e.g., the operation of the sodium-sulfur cell at temperatures above 300° C for sustained periods of time. In a first embodiment of the improvement of the invention a glass free seal is employed. This seal is a lap joint seal which is accomplished by disposing the end portion of a first one of the tubular members which is sintered, i.e., the tubular cation-permeable barrier or the tubular ceramic header, inside the end portion of the other of the tubular members which is unsintered and sintering that other tubular member to final density so as to effect a seal between the two tubular members.

In a second embodiment of the improvement of the invention the seal includes a glass material, preferably the borosilicate glass discussed above, which is disposed along the interface of the first and second tubes. In this embodiment, even though a glass is employed, the exposure of the same to corrosive material is greatly reduced since the glass material is disposed along the seal interface.

The invention will be more fully understood from the following detailed description of the invention when read in view of the drawings in which:

FIG. 1 is a schematic diagram of an energy conversion device embodying the lap joint seal of the first embodiment of the invention; and FIG. 2 is a cut-away section of a device such as shown in FIG. 1 with the section enlarged so as to illustrate the second embodiment of the invention.

DETAILED DESCRIPTION OF THE INVENTION

Figure 1:
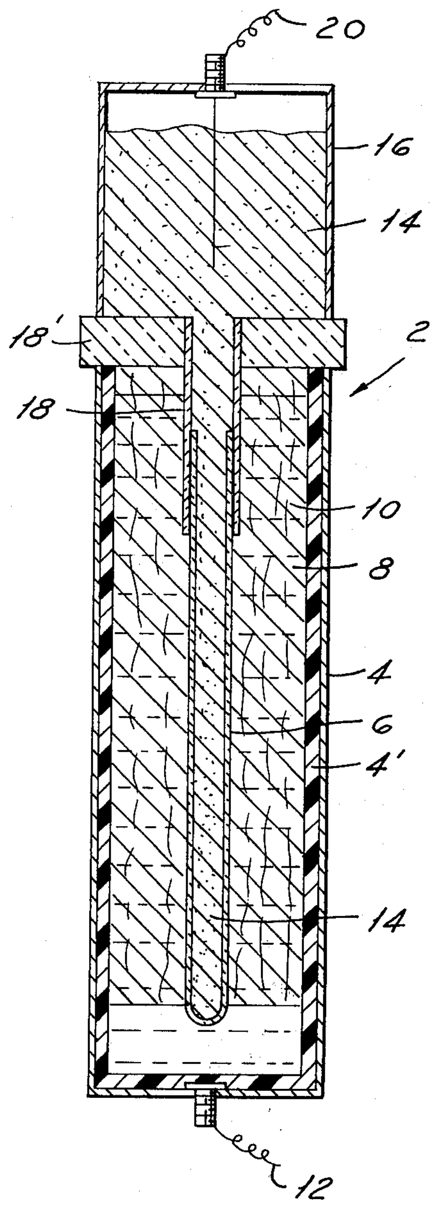

The first embodiment of the invention is illustrated in FIG. 1 which schematically illustrates an energy conversion device, such as a sodium/sulfur cell, generally indicated at 2. The illustrated cell comprises a tubular container which as shown may consist of a metal tube 4 which is provided with an interiorly disposed conductive film 4' which is resistant to attack by sulfur and multen polysulfide. The container is concentrically disposed about a tubular cation-permeable barrier 6 which may be formed of the various materials discussed previously including beta-type alumina. B''-alumina is particularly preferred. The annular space between barrier 6 and container 4 comprises the cathodic reaction zone 8 of the cell and contains the sulfur/polysulfide molten electrolyte of the cell. Cathodic reaction zone 8 also contains an electrode shown as a porous felt 10. Electrode 10 is in electrical contact with both barrier 6 and an external circuit, contact with the circuit being made via lead 12 through conductive container 4. The interior of barrier tube 6 comprises the anodic reaction zone of the cell which is filled with molten alkali metal 14, such as sodium. The alkali metal 14 is supplied to the anodic reaction zone from alkali metal reservoir 16. The container for the sodium reservoir 16 may be fabricated to proper size from a metal or alloy which is resistant to corrosive attack by alkali metal at 400° C (e.g., nickel, stainless steel) and hermetically sealed by active metal braze to impervious, nonconductive ceramic header 18 which connects reservoir 16 with cation-permeable barrier 16 and electrically separates the negative and positive poles of the cell. Header 18, as shown includes an integral plate or seal 18' of insulating material which completes the sealing of cathodic reaction zone 8 of reservoir 16. Note that molten alkali metal anode-reactant 14 is electrically connected to said external circuit via lead 20 which extends into said reservoir 16.

When such a cell is prepared, the anodic reaction zone and reservoir 16 are filled with an appropriate amount of molten alkali metal 14 and a small amount of inert gas is introduced through a fill spout.

As shown in the drawing nonconductive ceramic header 18 overlays cation-permeable barrier 6 so as to be hermetically sealed thereto. This seal is accomplished by disposing the end portion of tube 6 after it has been sintered to final density inside the end of tubular member 18 which is in the unsintered state and then sintering tube 18 to final density. By proper choice of component diameters and precise control of the sintering program, tube 18 can be shrunk during sintering to tightly bond to barrier 6. It has been found that the inner diameter of tube 18 should be such that if it is allowed to freely shrink during sintering, it would be about 0.002 inches smaller in diameter than the outer diameter of the mating tube 6. By so shrinking a tube of a first composition onto a tube of a second composition an integral seal is achieved. It is probable that by employing this technique a compositional gradient is, in fact, created passing from the composition of the first ceramic to the composition of the second ceramic through an intermediate composition formed by the sealing process. In any event, the integral seal thus produced without the need for a glass seal such as previously employed overcomes many of the aforementioned disadvantages of the butt seal, in particular, the problem of temperature limitations for cell operation.

As mentioned above, beta-type alumina, and in particular B''-alumina, are preferred as compositions for barrier 6. Header 18, including plate or disc 18', is preferably formed of alpha-alumina. Alpha-alumina compositions such as Linde C alumina and Alcoa XA-16 Superground are commercially available.

While the glass-free seal embodiment of the invention is illustrated with header 18 overlapping barrier 6, this geometry may be reversed so that an unsintered barrier tube is shrunk around a presintered header 18 to effect the desired seal.

It will be appreciated by those skilled in the art that the sintering temperatures and other sintering parameters employed to effect the desired seals will vary depending on the materials being used. When alpha-alumina is sintered to seal to presintered B''-alumina the composite is normally sintered at between about 1500° C and about 1800° C for between about 20 and about 180 minutes. A preferred temperature is about 1550° C for between 30 and 45 minutes.

Figure 2:
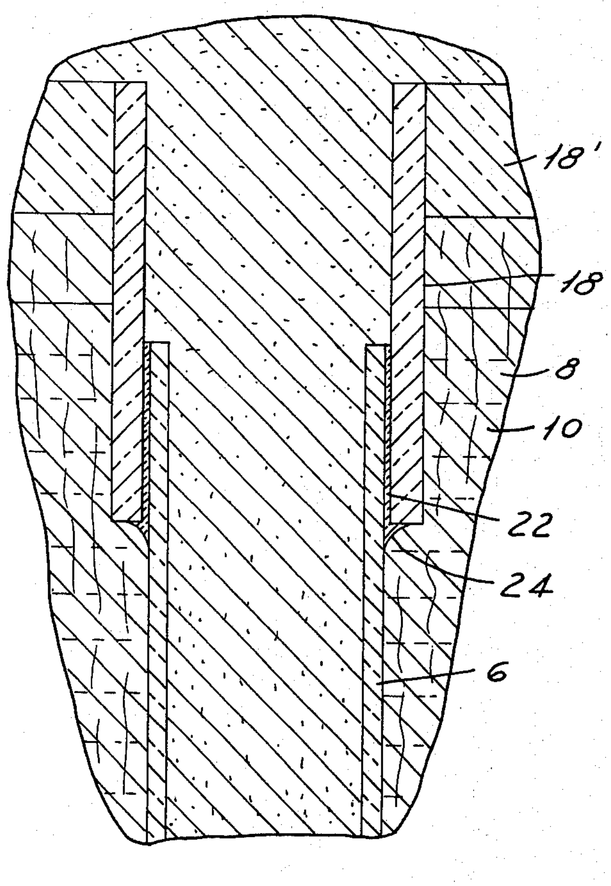

The enlarged section of FIG. 2 showing a cell similar to that of FIG. 1 illustrates the second embodiment of the invention. In the seal of this embodiment a glass material 22 is disposed along the interface of the first and second tubes which have been sealed together in the manner of the first embodiment discussed above. In this second embodiment, in which the glossy phase does not serve as the primary load bearing member as with the butt seal, the seal may be prepared by a two-step process. The first step is the same as the first embodiment discussed above. The second step, which improves the hermeticity of the seal may be accomplished by applying a layer of findly ground glass, such as the horosilicate glass discussed above, suspended in a vehicle to the juncture or interface of the wall of one of the tubes (shown as cation-permeable barrier 6 in FIG. 2) and the end of the other tube (shown as nonconductive header 18 in FIG. 2). The assembly of the two tubes and the glass, which of course will during processing be disposed as is convenient for accomplishing processing and not necessarily as shown in FIG. 2, is heated to a temperature, e.g. 800°–900° C, and for a time necessary to melt the glass and allow it to flow, dictated by wetting of the ceramics into the interstices of the seal between barrier 6 and header 18. Capillary forces may serve to draw the molten glass partially into the interface between the two tubes. After holding at temperature the composite is then slowly cooled to annealing temperature, annealed and finally cooled to room temperature. A further technique which may also be employed to assist in applying the glass to the interface is that of applying a vacuum to the inside of the composite of the two tubes to provide an added impetus for the glass to flow into the interstices remaining in the seal between the two tubes. It will be appreciated by those skilled in the art that various other methods of applying the glass to the interface in the interstitial spaces of the seal may be employed.

As shown in FIG. 2 glass material 24 may also be applied in such an amount that a glass fillet remains at the juncture or interface of the wall of the first tube and the end of the second.

As mentioned previously, the primary advantage of this type of seal over that of the current butt seal is that the sealant glass is not serving as a load-bearing member of the seal. Therefore, a catastrophic failure in the glass joint will not necessarily be followed by a massive alkali metal spill into the cathodic reaction zone and a possible resulting large, exothermic reaction). A second advantage is the presentation of a reduced surface area of glass exposed to attack by the alkali metal, thereby reducing the rate of corrosion. In the embodiment where glass is employed, a long path of glass with small cross-sectional area results, and the area exposed to corrosive attack is minimized.

The invention will be more fully understood from the specific examples which follow. It should be appreciated that these examples are merely intended to be illustrative and not limiting in any way.

EXAMPLE I

The preparation of a glass-free seal in this example involves the shrinkage, during sintering, of a green, alpha-alumina cylinder onto a previously sintered B''-alumina, tubular electrolyte.

This operation was accomplished by beginning with a fully dense, B''-alumina tube which has the final composition: 8.7% $Na_2O$-0.7% $Li_2O$-90.6% $Al_2O_3$. A cylinder of Linde C alpha-alumina was formed by uniaxially pressing a powder with suitable binder addition into a solid, cylindrical shape and then further compacting by wet-bag, isostatic pressing as is well known in the art. This solid cylinder was then bored out to an inner diameter such that (based upon known shrinkages during sintering) if allowed to freely shrink, the cylinder would attain an inner diameter 0.002'' smaller than the outer diameter of the B''-alumina tube onto which the cylinder is being shrink-sealed. The outer diameter of the B''-alumina tube was machined to eliminate tube eccentricity and surface roughness. The unfired, alpha-alumina tube was then positioned onto the sintered, B''-alumina tube and the assembly was encapsulated and fired at 1550° C for 30 minutes to densify the alpha alumina collar. During this period, the alpha-alumina shrinks, while densifying, and grips tightly onto the B''-alumina tube, thereby effecting a seal between the disimilar materials.

EXAMPLE II

In this example an unfired B''-alumina tube is applied to and shrunk around a previously densified, alphaalumina cylinder. This is accomplished by inserting a length of high purity, commercially-obtained, alphaalumina into the bore of a 1 cm B''-alumina tube of composition: 9.0% $Na_2O$-0.8% $Li_2O$-90.2% $Al_2O_3$. The outer diameter of the alpha-alumina was 0.325 inches, while the B''-alumina tube of this composition normally shrinks to an inner diameter of 0.290 inches to 0.300 inches when sintered. The assembly was encapsulated in platinum and fired at 1580° C for 20 minutes in order to densify the B''-alumina tube. The mass was then cooled to 1450° C and held for 8 hours to relieve the strain and to promote additional diffusional bonding between the components. During the densification cycle of the B''-alumina, it had shrunk onto and tightly gripped the alpha-alumina tube, thereby effecting a seal between the two materials.

EXAMPLE III

In this example a hybrid seal is prepared. We begin with a solid state seal produced as in Examples I or II. As produced, these seals have connected porosity along the interface between the alpha-alumina and the B''-alumina components. To complete the hermetic sealing of this assembly, glass is introduced into this annular volume. Glass, at room temperature, is deposited at the interface fritted form and melted at 800°–1100° C for 20 minutes to promote flow and subsequent sealing of the annular interstices of the seal. The glass may be manually applied by caning onto the seal composite while the assembly is maintained at a temperature sufficient to promote glass melting and flow. Vacuum applied to the sealed composite may assist in drawing the viscous glass into the annular space, thereby promoting the continuous film of glass which is desired for the final sealing of the connected porosity remaining after the solid state (glass free) sealing procedure.

Based upon the foregoing description of the invention what is claimed and desired to be protected by Letters Patent is:

1. In an energy conversion device comprising:

A. An anodic reaction zone
   i. which contains a molten alkali metal anode-reactant in electrical contact with an external circuit, and
   ii. which is disposed interiorly of a tubular cation-permeable barrier to mass liquid transfer;

B. A cathodic reaction zone
   i. which is disposed exteriorly of said tubular cation-permeable barrier, and
   ii. which contains an electrode which is in electrical contact with both said tubular cation-permeable barrier and said external circuit;

C. A reservoir for said molten alkali metal which is adapted to supply said anodereactant to said anodic reaction zone; and D. A tubular ceramic header
   i. which connects said reservoir with said anodic reaction zone so as to allow molten alkali metal to flow from said reservoir to said anodic reaction zone;
   ii. which is sealed to said tubular cation-permeable barrier, and
   iii. which is impervious and nonconductive so as to preclude both ionic and electronic current leakage between said alkali metal reservoir and said cathodic reaction zone, wherein the improvement comprises a lap joint seal between said tubular ceramic header and said tubular cation-permeable barrier which is formed by

1. disposing the end portion of a first one of said tubes, which has been sintered to final density, inside the end portion of the second of said tubes which (i) is not sintered to final density, (ii) has an inner diameter in the unsintered state greater than the outer diameter of said first tube, and (iii) upon being sintered to final density is adapted to shrink to the extent that the inner diameter thereof is at least 0.002 inches less than the said outer diameter of said first tube; and 2. sintering said second tube to final density to shrink the same and effect a seal between said first and second tubes.

2. A device in accordance with claim 1 wherein said first tube is formed of beta-type alumina and said second tube is formed of alpha-alumina.

3. A device in accordance with claim 2 wherein said first tube is formed of B''-alumina.

4. A device in accordance with claim 1 wherein said first tube is formed of alpha-alumina and said second tube is formed of beta-type alumina.

5. A device in accordance with claim 4 wherein said second tube is formed of B''-alumina.

6. A device in accordance with claim 1 wherein said seal includes a glass material which is disposed along the interface of said first and second tubes.

7. A device in accordance with claim 6 wherein said glass material is a borosilicate glass formed from about 6 to about 11 weight percent of $Na_2O$, about 41 to about 51 weight percent of $SiO_2$ and about 53 to about 59 weight percent of $B_2O_3$.

8. A device in accordance with claim 6 wherein said seal also includes an annular fillet of glass disposed about the interface of the wall of said first tube and the overlapping end of said second tube.

9. In a secondary battery or cell comprising:

A. An anodic reaction zone
   - i. which contains a molten alkali metal-anode in electrical contact with an external citcuit, and
   - ii. which is disposed interiorly of a tubular cation-permeable barrier to mass liquid transfer;

B. A cathodic reaction zone
   - i. which is disposed exteriorly of said tubular cation-permeable barrier,
   - ii. which contains a cathodic reactant which, when the battery or cell is at least partially discharged, is selected from the group consisting of (a) a single phase composition comprising a molten polysulfide salt of said anodic reactant and (b) a two phase composition comprising molten sulfur and molten sulfur saturated polysulfide salts of said anodic reactant, and
   - iii. which contains an electrode which is in electrical contact with both said tubular cation-permeable barrier and said external circuit;

C. A reservoir for said molten alkali metal which is adapted to supply said anode-reactant to said anodic reaction zone; and D. A tubular ceramic header
   - i. which connects said reservoir with said anodic reaction zone so as to allow molten alkali metal to flow from said reservoir to said anodic reaction zone;
   - ii. which is sealed to said tubular cation-permeable barrier, and
   - iii. which is impervious and nonconductive so as to preclude both ionic and electronic current leakage between said alkali metal reservoir and said cathodic reaction zone, wherein the improvement comprises a lap joint seal between said tubular ceramic header and said tubular cation-permeable barrier which is formed by 1. disposing the end portion of a first one of said tubes, which has been sintered to final density, inside the end portion of the second of said tubes which (i) is not sintered to final density, (ii) has an inner diameter in the unsintered state greater than the outer diameter of said first tube, and (iii) upon being sintered to final density is adapted to shrink to the extent that the inner diameter thereof is at least 0.002 inches less than the said outer diameter of said first tube, and 2. sintering said second tube to final density to shrink the same and effect a seal between said first and second tubes.

10. A device in accordance with claim 9 wherein said first tube is formed of beta-type alumina and said second tube is formed of alpha-alumina.

11. A device in accordance with claim 10 wherein said first tube is formed of B''-alumina.

12. A device in accordance with claim 9 wherein said first tube is formed of alpha-alumina and said second tube is formed of beta-type alumina.

13. A device in accordance with claim 12 wherein said second tube is formed of B''-alumina.

14. A device in accordance with claim 9 wherein said seal includes a glass material which is disposed along the interface of said first and second tubes.

15. A device in accordance with claim 14 wherein said glass material is a borosilicate glass formed from about 6 to about 11 weight percent of $Na_2O$, about 41 to about 51 weight percent of $SiO_2$ and about 53 to about 59 weight percent of $B_2O_3$.

16. A device in accordance with claim 14 wherein said seal also includes an annular fillet of glass disposed about the interface of the wall of said first tube and the overlapping end of said second tube.

17. A device in accordance with claim 14 wherein said first tube is formed from B''-alumina and said second tube is formed from alpha-alumina.

18. A device in accordance with claim 17 wherein said glass material is a borosilicate glass formed from about 6 to about 11 weight percent of $Na_2O$, about 41 to about 51 weight percent of $SiO_2$ and about 53 to about 59 weight percent of $B_2O_3$.

19. A device in accordance with claim 17 wherein said seal also includes an annular fillet of glass disposed about the interface of the wall of said first tube and the overlapping end of said second tube.

* * * * *